United States Patent [19]

Grimaud et al.

[11] 3,870,767

[45] Mar. 11, 1975

[54] OLEOPHOBIC AND HYDROPHOBIC POLYMERS CONTAINING POLYMERIZATION PRODUCT OF FLUORINATED SULFONAMIDOETHYLENE MOIETIES

[75] Inventors: Edouard Grimaud, Oullins; Maurice Troussier, Pierre-Benite, both of France

[73] Assignee: Pechiney Ugine Kuhlmann, Paris, France

[22] Filed: Oct. 6, 1972

[21] Appl. No.: 295,653

[30] Foreign Application Priority Data

Oct. 8, 1971  France............................ 71.36310

[52] U.S. Cl....... 260/836, 117/139.5 A, 117/143 H, 260/296 RB, 260/831, 260/847, 260/884
[51] Int. Cl...................... C08g 45/04, C08g 19/00
[58] Field of Search............................ 260/884, 836

[56] References Cited
UNITED STATES PATENTS

| | | | |
|---|---|---|---|
| 3,068,187 | 12/1962 | Bolstad............................ | 260/884 |
| 3,256,231 | 6/1966 | Johnson........................... | 260/884 |
| 3,407,247 | 10/1968 | Reinhardt......................... | 260/884 |
| 3,574,791 | 4/1971 | Sherman........................... | 260/884 |

*Primary Examiner*—Paul Lieberman
*Attorney, Agent, or Firm*—Pennie & Edmonds

[57] ABSTRACT

Oleophobic and hydrophobic polymers are disclosed which are obtained from the polymerization of one or more fluorinated monomers with or without a minor amount of one or more nonfluorinated monomers in the presence of a nonfluorinated acrylic resin which represents from 20 to 80% by weight of the mixture of the monomer and resin. These polymers are useful for imparting oleophobic and hydrophobic properties to substrates such as textiles.

6 Claims, No Drawings

OLEOPHOBIC AND HYDROPHOBIC POLYMERS CONTAINING POLYMERIZATION PRODUCT OF FLUORINATED SULFONAMIDOETHYLENE MOIETIES

SUMMARY OF THE INVENTION

The polymers of this invention when applied to substrates such as textiles impart exeptional oleophobic and hydrophobic properties thereto. These polymers are prepared by polymerizing one or more fluorinated monomers, and optionally, a minor amount of one or more nonfluorinated monomers in the presence of a nonfluorinated acrylic resin which represents from 20 to 80% by weight of the mixture of monomer and resin.

DESCRIPTION OF THE PREFERRED EMBODIMENTS

Numerous fluorinated and nonfluorinated monomers and nonfluorinated acrylic resins can be employed in the process for preparing the oleophobic and hydrophobic polymers of this invention as will hereinafter be readily apparent to one skilled in the art.

It is especially advantageous to employ the acrylic or methacrylic esters of polyfluorinated sulfonamidoalcohols of the general formula

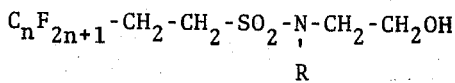

which are disclosed and claimed in copending commonly assigned United States application Ser. No. 9,414, filed Feb. 6, 1970 now abandoned and is incorporated by reference herein.

In the above structural formula, the radical $C_nF_{2n+1}$—represents a straight or branched perfluorinated chain in which $n$ is an integer from 1 to about 20 and R can be a hydrogen atom, an alkyl radical of from 1 to about 10 carbon atoms, a cycloalkyl radical of from 5 to about 12 carbon atoms, an unsubstituted aryl radical or an aryl radical substituted with an alkyl radical of from 1 to 6 carbon atoms or the radical —R'OH in which R' is an alkylene radical of from 2 to 4 carbon atoms.

For example when R is an alkyl radical, the radical can be methyl, ethyl, propyl, isopropyl, n-butyl, sec-butyl, tert-butyl, pentyl, hexyl, heptyl, or decyl radical.

When R is a cycloalkyl radical, the radical can be a cycloheptyl, methylcycloheptyl, cyclohexyl, methylcyclohexyl, 'dimethylcyclohexyl, cyclooctyl, ethylcyclooctyl or diethylcyclooctyl.

When R is an unsubstituted or an alkyl substituted aryl radical, the radical can be a phenyl, toluyl, p-ethyltoluyl, ethylbenzyl, n-propylbenzyl, o-xylyl, m-xylyl, p-xylyl, diphenylmethyl, naphthalenyl, anthracenyl, phenanthrenyl, or 2-methyl-naphthalenyl radical.

When R is the radical R'OH, the radical can be a hydoxyethyl, hydroxypropyl, hydroxyisopropyl or hydroxybutyl radical.

The fluorinated sulfonated aminoalcohols (sulfonamido-alcohols) which can be employed herein are prepared by reacting a polyfluorinated sulfonic acid chloride of the formula:

$$C_nF_{2n+1}—CH_2—CH_2—SO_2Cl$$

with an aminoalcohol of the formula:

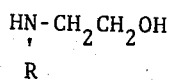

in which $n$ and R have the same meaning heretofore designated.

The reaction between the polyfluorinated sulfonic acid chloride and the aminoalcohol can be carried out under various reaction conditions and in various molar ratios to produce practically a pure product. The reaction can be carried out at a temperature between 0° and 150°C, advantageously in the presence of an inert solvent and with a molar ratio of aminoalcohol to sulfonic acid chloride of from 2 to 10:1 to aid in the neutralization of the hydrochloric acid released during the reaction.

For example, 60 g of $CH_3 — NH — CH_2 — CH_2OH$ (0.8 mole) were introduced into a solution of 109.2 g of $C_8F_{17} — CH_2 — CH_2 — SO_2Cl$ (0.2 mole) and 300 cm³ of ethyl acetate at a temperature of 50°C over a period of 1 hour. The reaction medium was maintained at this temperature for three hours. The reaction mixture was cooled down to 20°C and 33 cm³ of concentrated hydrochloric acid added thereto. The reaction mixture was filtered at 65°C and a solid and a filtrate (1) recovered therefrom. The solid was washed with water (two times with 100 cm³) and a solid (A) was collected which, after drying, weighed 10.4 g and was analyzed as the sulphamido-ester:

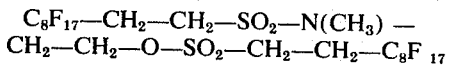

The filtrate (1) comprised two phases and the top phase was decanted. The top or decanted phase was cooled down between 0° and 5°C. A solid (B) and a filtrate (2) was collected by filtration. Evaporation of the filtrate (2) left a solid (C). The solid (B) weighed 82.1 g and was analyzed as the sulphamidoalcohol:

$$C_8F_{17} — CH_2 — CH_2 — SO_2 — N(CH_3) — CH_2 — CH_2OH$$

The solid (C) weighed 17 g and constituted more than 92 percent of the same sulphamido-alcohol. The transformation rates to sulphamido-alcohol and sulphamido ester were respectively 82 percent and 9 percent. The production of other fluorinated sulfonated aminoalcohols in which the numerical value of $n$ is different can be readily prepared in the same or similar manner as described above as will be readily apparent to those skilled in the art.

The polyfluorinated sulfonic acid chlorides used to prepare the alcohols can be prepared by reacting a polyfluorinated sulfocyanide with chlorine according to the following equation:

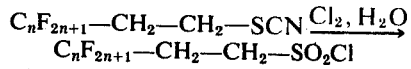

wherein $n$ has the same meaning given above. For example, $C_6F_{13}—C_2H_4 — SO_2Cl$ can be prepared by bubbling chlorine through a mixture of $C_6F_{13} — C_2H_4 — SCN$ (40.5 grams; 0.1 mole), 100 cm³ of icy acetic acid and 12 cm³ of water at the rate of 5 l per hour for a period of two hours while maintaining the reaction mixture at 63°C. The introduction of the chlorine causes a rise in the temperature to 72°C after 30 minutes. This temperature remained stable for 30 minutes and then gradually went down to 63°C. The chlorine output was stopped and the apparatus or reaction vessel purged with nitrogen for 30 minutes. A mineral solid (4.9 grams) was removed from the reaction mixture by filtration, the main compoent of which was ammonium chloride. The filtrate was then distilled and four fractions and one residue were obtained as follows:

a. 52°–60°/100 mm; composed of water and acetic acid b. 62°–66°/100 mm; 61 g. 50 cm$^3$ of water was added to this fraction, and a dense phase (1.5 g) decanted composed of $C_6F_{13}$ — $C_2H_4$ — $SO_2Cl$ (68 percent; 2.4 mmole) and $C_6F_{13}$ — $C_2H_4$ — Cl (32 percent)

c. 38°–105°/20 mm; 9.2 g; $C_6F_{13}$ — $C_2H_4$ — Cl (51 percent) $C_6F_{13}$ — $C_2H_4$ — $SO_2Cl$ (7 percent 1 2.6 mmole)

Monochloracetic acid (9.2 percent), acetic acid (31 percent)

d. 108°–115°/20 mm; 33.4 g; $C_6F_{13}$ — $C_2H_4$ — $SO_2Cl$ (85.4 percent; 65 mmole), $C_6F_{13}$ — $C_2H_4$ — Cl (14.6 percent; 11 mmole)

e. Residue 1.5 g unidentified.

$C_6F_{13}$ — $C_2H_4$ — $SO_2Cl$ was obtained with a conversion rate of 70 percent and a yield of 78.5 percent.

Other polyfluorinated sulfonic acid chlorides can be prepared varying the numerical value of $n$ as will be readily apparent to those skilled in the art. A further and more detailed description of how various polyfluorinated sulfonic acid chlorides can be prepared is disclosed in copending and commonly assigned U.S. application Ser. No. 851,081, filed Aug. 18, 1969, which is incorporated by reference herein.

The polyfluoroalkyl sulfocyanides of the formula $C_nF_{2n+1}$—$(CH_2)_b$—SCN used to prepare the above polyfluorinated sulfonic acid chlorides can be prepared by reacting a polyfluoroalkyl halide with a sulfocyanide, such as, KSCN, at a temperature between about 0° and 250°C.

$C_6F_{13}$ —$C_2H_4$ —SCN was prepared, for example, by heating a mixture of 31 g of KSCN and 100 cc of ethanol to 78°C under constant stirring and then adding 94.8 g of $C_6F_{13}$ — $C_2H_4$ — I over a period of 1½ hours while maintaining the reaction mixture at 78° for 4½ hours. The remaining solid comprising potassium iodide was removed by filtration and the filtrate distilled to yield ethyl alcohol and the following fractions:

1. A fraction separated at 89° and 20 mm Hg, weighing 14 g. This fraction contained
$C_6F_{13}$ — $C_2H_4$ — I (78.4 percent),
$C_6F_{13}$ — $C_2H_4$ — SCN (19.6 percent),
and three nonidentified impurities (2 percent).

2. A fraction separated between 121° and 122°C. at 20 mm Hg and weighing 53.5 g. This fraction contained 132 moles of $C_6F_{13}$ — $C_2H_4$ — SCN. The $C_6F_{13}$ — $C_2H_4$ — SCN was solid at room temperature and melted at approximately 35°C.

The conversion rate and the yield of $C_6F_{13}$ — $C_2H_4$ — SCN were 69 and 79 percent, respectively.

The production of other polyfluoroalkyl sulfocyanides in which the numerical value of $n$ is different can be prepared in the same or similar manner as described above as will be apparent to those skilled in the art. A further and more detailed description of the preparation of the polyfluoroalkyl sulfocyanides is described in copending and commonly assigned United States application, Ser. No. 795,063, filed Jan. 29, 1969, which is incorporated by reference herein.

The fluorinated monomer or mixture of fluorinated monomers can be polymerized with a minor amount of one or more nonfluorinated monomers. When this is the case, the nonfluorinated monomers are advantageously alkylacrylates and alkylmethacrylates in which the alkyl radical contains from 1 to about 20 carbon atoms. The nonfluorinated monomers can be present up to about 30% by weight of the total monomer, including nonfluorinated monomer, present. This upper limit does not represent a critical parameter.

The nonfluorinated acrylic resin can be one or several of the following polymers prepared by any of a number of known and conventional polymerization processes:

a. the alkyl acrylate or alkylmethacrylate homopolymers in which the alkyl radical contains from 1 to about 20 carbon atoms;

b. the copolymers containing several acrylates or methacrylates such as in (a); and c. the copolymers containing (b) and in addition thereto, from about 0.5 to 20%, and advantageously, fromm about 1 to 10% by weight of one or more of the following monomers: N-methylolacrylamide, hydroxyethylacrylate, hydroxypropylacrylate, hydroxyethylmethacrylate, hydroxypropylmethacrylate, glycidylacrylate, glycidylmethacrylate, acrylic acid or methacrylic acid. These monomers facilitate the adhesion or binding of the polymers of this invention upon substrates such as textiles. They improve the sizing or coating and especially, the resistance of the coating to washing.

Polymerization of the monomers is carried out using a polymerization initiator of the free radical type either in organic solvent medium or as an emulsion in an essentially aqueous medium.

When polymerization is carried out in an organic solvent medium, any solvent or blend of solvents whch dissolve both the nonfluorinated acrylic resin and the fluorinated and nonfluorinated monomers can be used. Ketones are particularly advantageous for this purpose. The free radical polymerization initiators are selected from the group consisting of organic peroxides or azo compounds. Polymerization temperature depends upon the particular polymerization initiator employed but is generally in the range of from about 40°–100°C.

When polymerization is carried out in an aqueous emulsion the acrylic resin should be dispersed throughout the medium. A resin which is prepared in emulsion, in which case the resin is present in dispersed form, or a resin prepared in solution which is mechanically emulsified in the presence of stabilizing agents, can be used. Polymerization is carried out in the presence of one or more initiators and emulsifiers. The initiator or initiators, advantageously water soluble, can be selected from amongst the ammonium or alkaline persulfates, hydrogen peroxide and oxidation-reduction systems such as persulfate-ferrous sulfate or persulfate-sodium bisulfite. The emulsifiers are selected from the anionic, cationic or nonionic emulsifiers. Salts which modify the pH or ionic force of the medium can advantageously be added. The polymerization temperature is a function of the initiator system selected and can be between about 15° and 100°C with about 40° to 90°C being generally employed.

Whether polymerization is carried out in an organic solvent medium or in aqueous emulsion, a chain transfer agent which modifies the molecular weight of the polymer obtained can advantageously be used. Aliphatic mercaptans such as 2-ethylhexylmercaptan, n-dodecylmercaptan and t-dodecylmercaptan are useful for this purpose.

Numerous variations in carrying out the organic solvent or emulsion polymerization of this invention can be employed as is readily understood by one skilled in the art. The resulting polymers are obtained either in organic solution or as aqueous dispersions.

When the polymers herein are obtained in the form of organic solvent solutions, they can be utilized as such, generally upon dilution, for the treatment of textiles and other substrates. The polymers can also be precipitated out of solution using a nonsolvent and then redissolved or dispersed in a suitable liquid before being applied.

When the polymers herein are obtained in the form of aqueous dispersions, they can often be applied as such after dilution to a suitable level of concentration.

The polymers of this invention to which can be added various additives as is deemed necessary or desirable impart remarkable oleophobic and hydrophobic properties to substrates to which they are applied. The polymers are particularly useful when applied to natural and synthetic textiles. The optimum amount of polymer or mixture of polymers to be deposited upon the textiles will depend upon the particular nature of the textiles and the degree of oleophobic and hydrophobic character desired. Generally this amount is from about 0.5 to 2% by weight of the dry polymer by weight of substrate. Application of the polymers of this invention to fabric, either as solutions or dispersions can be accomplished by immersion, pulverization or any other suitable means. The treated fabrics are then pressed to eliminate excess liquid, dried and then subjected to thermal treatment at a temperature of from 120° to 190°C for a period of several minutes. The exact finishing conditions are a function of the particular fabric treated and the apparatus used for this purpose should not subject the fabric to any significant damage. Thermal treatement improves the resistance of the deposited film to washing. Thermal treatement is also advantageous in the application of the polymers herein to other substrates such as metal surfaces.

The remarkable properties imparted to fabrics and other substrates by the compounds of this invention are due to the nature of the compounds as being derived from the polymerization of a fluorinated monomer or mixture thereof in the presence of nonfluorinated acrylic resin. If one were to simply apply a homogenous mixture of fluorinated polymer and nofluorinated acrylic resin of overall composition equivalent to the polymers herein to a fabric or any other substrate, such would be found to be very difficult and the oleophobic and hydrophobic properties would be insignificant or at the very least substantially inferior to the properties obtained using the polymers of this invention.

A possible but still theoretical explanation of the superiority of the polymers of this invention over a simple mixture of polymers as set forth above is that during the preparation of the former, part of the fluorinated macromolecules are grafted upon the nonfluorinated acrylic resin. The new structure which forms is thought to be responsible for the remarkable properties of the polymers herein.

The polymers of this invention can be applied to textiles and other substrates alone or in mixture with other resins and products which simply serve as diluents thus permitting a reduction in the amount of fluorinated compound used without interfering with the oleophobic and hydrophobic properties or which serve to modify the coatings or sizings by improving their characteristics or imparting thereto still other characteristics.

Resins which can be used as diluents include, for example, nonfluorinated acrylic resins analagous to those used in the preparation of the polymers or any other filmogenous resins which are compatible with the polymers.

As for the resins or products serving a role other than that of diluent, such materials belong to the known and conventional textile finishing products too numerous to be cited herein. The modified or unmodified urea formaldehyde resins are an example of such products. These or similar resins are often accompanied by mineral salts which function as polycondensation catalysts. The resins or other products added to the polymers of this invention should be added under such conditions that they will be physically compatible and not interfere in any way with the essential characteristics of the polymers.

The following examples are illustrative of the polymers of this invention, the process whereby they are prepared and the manner in which they can be used. In the examples, the oleophobic character of the treated fabric was measured by the Grajek and Peterson method published in the Textile Research Journal, April 1962, page 323. The wettability of the treated fabric was observed with paraffin oil and solutions of heptane and paraffin oil. The value of 150 was assigned to fabric not wetted by pure heptan, 140 to fabric not wetted by a solution of 90/10 heptane and paraffin oil but wetted by pure heptane and so forth. When the fabric was not wetted by pure paraffin oil but by a 10/90 mixture of heptane and paraffin oil, the oleophobic character was found to be 50 and it decreased to 0 when there was wetting by the oil.

The hydrophobic character of the polymers of this invention was determined by the appearance of the treated fabric after spraying with water under defined conditions according to the ASTMD 583-63 method. The hydrophobic values range from 0 to 100. The value of 0 corresponds to total wetting and the value of 100 is assigned when there is absolutely no wetting.

In the following examples $AF_8$ represents the fluorinated monomer:

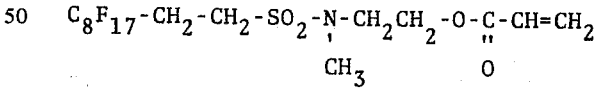

$AF_6$ represents the monomer:

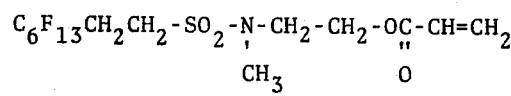

and MIBK designates methyisobutylketone.

The fabrics employed were a cotton satin of 300 g/m2 and a polyester satin of 96 g/m².

EXAMPLE 1

The Nonfluorinated Acrylic Resin

A nonfluorinated acrylic resin was prepared from the following:

| Reaction components | Parts by weight |
|---|---|
| heptyl acrylate | 28.8 |
| N-methylolacrylamide | 1.2 |
| MIBK | 70.0 |
| benzoyl peroxide | 0.15 |

The products were reacted in an inert atmosphere for 2 hours at 75°C and 2 hours at 80°C under agitation to provide an even temperature throughout the medium. The reactor was then cooled and opened. A solution of copolymer of heptylacrylate and N-methylolacrylamid in MIBK was recovered. The dry extract of the solution was 30% by weight thus indicating practically complete conversion of the monomers.

The fluorinated polymer $AF_8$ was employed as the fluorinated monomer. The polymerization reactor was charged with 34 parts by weight of the above solution of nonfluorinated acrylic resin containing 10 parts of the resin and 24 parts of MIBK. 56 parts of MIBK followed by 10 parts of $AF_8$ and finally 0.1 parts of t-butylhydroperoxide were added. The initial composition of this reaction medium was therefor as follows:

| Reaction components | Parts by Weight |
|---|---|
| nonfluorinated acrylic resin | 10 |
| $AF_8$ | 10 |
| MIBK | 80 |
| t-butylhydroperoxide | 0.1 |

The reactor was given an inert atmosphere and then heated for 20 hours at 85°C and 2 hours at 95°C. The reaction medium was subjected to mild stirring. After cooling, the polymer was recovered by precipitation in 400 parts of methanol and dried. 14.4 parts of a light yellow solid which titrated 20.5% fluorine was recovered.

Application of the Fluorine Polymer to Cotton Fabric

A 0.8% acetone solution of the fluorine polymer was applied to a sample of cotton satin by immersion of the latter in the solution. The fabric was then dried and subjected to heating for 5 minutes at 180°C. The deposited polymer represented 0.9% by weight of the fabric in dry material.

The oleophobic character of the treated fabric was measured by the above described method. The value was 110. The same cloth was washed by agitation for thirty minutes in a 0.5% solution of a commerical wash heated to boiling and then rinsed with water. After the washing, the oleophobic character was 100 and remained at 90 after five successive washings carried out under the same conditions as the first.

The hydrophobic character of the treated fabric measured by the previously described test was initially 80-90 and remained at 80 after five washings.

A sample of treated fabric which was no longer washed in an aqueous wash solution but immersed in trichlorethylene for twenty minutes at ambient temperature did not exhibit any modification in hydrophobic or oleophobic character.

EXAMPLE 2

With the exception that $AF_6$ was employed, substantially the same conditions as in EXAMPLE 1 were repeated.

16.7 parts of a solid, light-yellow product containing 20.9% fluorine was recovered. The polymer was applied to cotton satin as in EXAMPLE 1. 0.8% of the dry polymer was deposited on the fabric.

The initial oleophobic character was 110 and remained 100 after five successive washings.

The hydrophobic character was initially 80 and remained unchanged after five washings.

Wetting of the fabric in trichloroethylene did not alter the oleophobic or hydrophobic properties.

EXAMPLE 3

A fluorinated composition was prepared in accordance with the general conditions of EXAMPLE 1 but in modifying, as folloes, the quantities of nonfluorinated acrylic resin and $AF_8$:

| Reaction components | Parts by Weight |
|---|---|
| nonfluorinated acrylic resin | 15 |
| $AF_8$ | 5 |

The product which was obtained contained only about 9.7% fluorine.

Applied to cotton satin at a concentration of 0.9% by weight of the dried material compared to the fabric under substantially the same conditions as described above, despite the low fluorine content, the composition imparted an initial oleophobic level to the fabric of 100 and the level still remained at 70 after five washings.

EXAMPLE 4

The nonfluorinated acrylic resin

A copolymer of butyl acrylate and N-methylolacrylamide was prepared in solution by reacting the following:

| Reaction components | Parts by Weight |
|---|---|
| butyl acrylate | 28.8 |
| N-methylolacrylamide | 1.2 |
| MIBK | 70.0 |
| benzoyl peroxide | 0.15 |

The mode of operation was substantially the same as EXAMPLE 1. The dry extract of the solution was 30% by weight which demonstrated that the conversion was practically total.

The fluorinated polymer

By proceeding substantially the same as in EXAMPLE 1, 10 parts of fluorinated acrylate $AF_6$ were polymerized in the presence of 10 parts of butyl acrylate/N-methylolacrylamide copolymer which was previously prepared.

The product which was recovered titrated 22.7% fluroine.

The polymer was applied to cotton satin under substantially the same conditions set forth in EXAMPLE 1. The deposited polymer represented 0.8% by weight compared to the fabric in dry material.

The initial oleophobic character had a value of 110 and fell to 80 after five washings. The hydrophobic character was 80 and was between 70 and 80 after five washings.

The fluorinated polymer was also applied to a polyester fabric. The operating conditions were substantially the same as that used for the cotton fabric with the exception of the thermal treatment following drying. This treatment was five minutes at 150°C instead of 5 minutes at 180°C. The weight of polymer which had deposited upon the fabric represented 0.6% by weight of the fabric in dry material.

The initial oleophobic character was 140. It stayed at 100 after five washings. The hydrophobic character was initially 90 and remained equal to 80 after five washings.

EXAMPLE 5

The nonfluorinated acrylic resin

A copolymer of heptyl acrylate and hydroxyethyl methacrylate was prepared in solution. The reaction proceeded substantially the same as in EXAMPLE 1 with the sole difference that N-methylolacrylamide was replaced weight for weight with hydroxyethyl methacrylate. The conversion was total.

The fluorinated polymer

Using the fluorinated acrylate $AF_8$ and the nonfluorinated acrylic resin which had been previously prepared, the fluorinated polymer was produced following the method of operation described in EXAMPLE 1. The resulting polymer titrated 21% fluorine.

The polymer was applied to cotton satin under substantially the same conditions as in EXAMPLE 1. The deposited product represented 1% by weight of the fabric in dry material. The intial oleophobic character was 100 and was 50 after seven washings.

EXAMPLE 6

Mixture of a Fluorinated Composition with a Nonfluorinated Resin

A product analgous of that described in EXAMPLE 2, namely, a product prepared from fluorinated acrylate $AF_6$ and a copolymer of the heptyl acrylat/N-methylolacrylamide was used.

This product which titrated 19.5% fluorine was applied to cotton fabric and a polyester fabric.

The polymer which deposited upon the cotton fabric was approximately 0.8% by weight. The oleophobic character which initially was 120 fell to 110 after five washings.

The polymer which deposited upon the polyester fabric was approximately 0.5% by weight. The oleophobic character which initially was 150 fell to 140 after five washings.

The fluorinated product was then mixed with a nonfluorinated acrylic resin which moreover served in its preparation, in a ratio of about 2:1. The resulting mixture titrated 13% fluroine.

This mixture was applied to cotton and polyester fabrics. The amounts deposited were the same as those deposited with the fluorinated product. The consumption of fluorinated polymer was clearly lower than the latter and the oleophobic properties were only slightly diminished or even unchanged. With the cotton fabric the intial oleophobic value was 120 and after five washings the value was reduced to 90. With the polyester fabric the initial oleophobic value was 150 and after five washings this value fell to 140.

The intial hydrophobic value with the cotton fabric was 80 and after five washings it fell to 70 and the value with the polyester fabric was initially 90 and fell to 80 after five washings.

EXAMPLE 7

This example illustrates the preparation and application of a fluorinated composition not conforming to the present invention.

Equal parts of $AF_8$ homopolymer and a non-fluorinated acrylic resin of the same type as that described in EXAMPLE 1 were mixed together.

The resulting composition was applied to cotton satin under the usual conditions. The amount which had deposited was 1% by weight of the fabric, but according to the appearance of the treated fabric the deposition seemed to have been irregular. The hydrophobic and oleophobic properties of the treated fabric were null.

EXAMPLE 8

This example illustrates another fluorinated composition not conforming to the present invention.

A random copolymer of $AF_8$/heptyl acrylate/N-methylolacrylamide was prepared in solution. The amounts of monomers reacted are set forth below:

| Reaction components | Parts by Weight |
| --- | --- |
| $AF_8$ | 10 |
| heptyl acrylate | 9.6 |
| N-methylolacrylamide | 0.4 |

Polymerization was carried out in the absence of nonfluorinated acrylic resin in 80 parts MIBK using the general operating conditions of EXAMPLE 1. The random terpolymer which was obtained titrated 19.6% fluorine and its overall composition was very close to the fluorine product conforming to the present invention as set forth in EXAMPLE 1.

This new product was applied to cotton fabric under the usual conditions. The quantity composition which was deposited was 0.9% by weight compared to the weight of the fabric. The oleophobic value was at first only 50 and disappeared after the first washing.

The results, as those obtained in EXAMPLE 7, thus demonstrate the remarkable and unexpected oleophobic and hydrophobic properties of the fluorinated polymers according to the invention.

EXAMPLE 9

The fluorinated polymer according to the present invention was pepared according to the method of polymerization in an aqueous emulsion. The following reaction components were employed:

| Reaction components | Parts by Weight |
| --- | --- |
| heptyl acrylate/N-methylolacrylamide copolymer according to EXAMPLE 1. | 6.0 |
| MIBK | 14.0 |
| acetone | 14.0 |
| $AF_6$ | 10.0 |
| heptyl acrylate | 4.0 |

-Continued

| Reaction components | Parts by Weight |
| --- | --- |
| water | 65.0 |
| sodium dodecylbenzenesulfonate | 0.2 |
| potassium persulfate | 0.02 |

The heptyl acrylate/N-methylolacrylamide was utilized in a form of a MIBK solution. This solution and other reaction components were homogenized with a high speed turbine blender. The resulting mixture was placed into a degasified polymerization reactor and then heated under stirring for 4 hours at 80°C. A stable latex containing 18% solids was obtained.

The concentration of the latex was reduced to 3%.

Another 3% aqueous solution was prepared containing a reactive resin of the dihydroxyethyleneurea-formaldehyde precondensate type and zinc nitrate, the two components being in the rapport 9:1 .

The fluorinated polymer latex was mixed with an equal amount of the reactive resin aqueous solution described above.

The composition thus obtained which always titrated 3% dry extract was applied to cotton satin by soaking a sample of the cotton in the composition, drying the cotton sample and then treating the sample of the cotton for 5 minutes at 180°C. The weight of the deposited product was between 3 and 4% by weight of the farbic but only half of this quantity represented the fluorinated composition as such.

The oleophobic value of the fabric thus treated was initially 110. It changed very little upon washing and was still 100 after seven washings in a boiling wash.

The precedent composition was diluted to 1.5% with water and was used to treat another sample of cotton fabric. The product which had deposited was only 1.6 to 1.7% by weight of the fabric with only half representing the fluorinated composition as such.

The oleophobic character was still initially 90 and fell to 80 after seven washings in a boiling wash.

We claim:

1. Oleophobic and hydrophobic polymers obtained from the polymerization of one or more polyfluorinated sulfonamidoethylene acrylate or methacrylate monomers in the presence of a nonfluorinated acrylic resin which represents from 20 to 80% by weight of the monomer and resin and wherein the fluorinated sulfonamidoethylene moiety of the monomers is presented by the radical

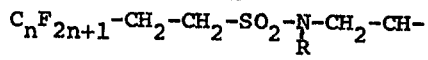

in which $C_nF_{2n+1}$ represents a straight or branched perfluorinated chain with $n$ being an integer from about 1 to 20 and R is a hydrogen atom, an alkyl radical of from 1 to 10 carbon atoms, a cycloalkyl radical of from 5 to about 12 carbon atoms, and unsubstituted aryl radical or an aryl radical substituted with an an alkyl radical of from 1 to about 6 carbon atoms or the radical R'OH with R' being an alkylene radical of from 2 to 4 carbon atoms and the nonfluorinated acrylic resin is selected from the group comprising an alkylacrylate or an alkylmethacrylate homopolymer in which the alkyl radical contains from about 1 to 20 carbon atoms; a copolymer containing several alkylacrylates or alkylmethacrylates in which the alkyl radicals contain from about 1 to 20 carbon atoms; and a copolymer containing one or more alkylacrylates or alkylmethacrylates wherein the alkyl radicals contain from about 1 to 20 carbon atoms and from 0.5 to 20% by weight of one or more monomers selected from N-methylolacrylamide, hydroxyethylacrylate, hydroxpropylacrylate, hydroxyethylmethacrylate, hydroxypropylmethacrylate, glycidylacrylate, glycidylmethacrylate, acrylic acid and methacrylic acid.

2. Oleophobic and hydrophobic polymers according to claim 1 wherein the fluorinated acrylate or methacrylate monomers are formed by reacting the alcohol of the fluorinated sulfonamidoethylene moiety with acrylic or methacrylic acid.

3. Oleophobic and hydrophobic polymers according to calim 1 wherein the nonfluorinated monomer is an alkyl acrylate or alkyl methacrylate in which the alkyl group contains from about 1 to 20 carbon atoms.

4. The method for rendering substrates hydrophobic and oleophobic which comprises employing an effective amount of at least one composition according to claim 1.

5. The method of claim 4 wherein the substrate is a textile.

6. Oleophobic and hydrophobic polymers according to claim 1 whrein the fluorinated monomers are polymerized with a minor amount of one or more nonfluorinated monomers in the presence of said nonfluroinated acrylic resin.

* * * * *

UNITED STATES PATENT AND TRADEMARK OFFICE
CERTIFICATE OF CORRECTION

PATENT NO. : 3,870,767
DATED : March 11, 1975
INVENTOR(S) : Edouard Grimaud and Maurice Troussier It is certified that error appears in the above-identified patent and that said Letters Patent are hereby corrected as shown below:

1. In Column 1, line 15, "of monomer" should be --of the monomer--.

2. In Column 3, line 5, "compoent" should be --component--.

3. In Column 3, line 23, "$\pm C_2H_4\}$" should be -- - $C_2H_4$ - --.

4. In Column 5, line 51, "nofluorinated" should be --nonfluorinated--.

5. In Column 6, line 33, "heptan" should be --heptane--.

7. In Column 8, line 21, "folloes" should be --follows--.

8. In Column 8, line 66, "fluroine" should be --fluorine--.

9. In Column 9, line 46, "acrylate/N" should be --acrylate/N--.

10. In Column 9, line 61, "fluroine" should be --fluorine--.

11. In Column 10, line 46, "The quantity composition" should be --The quantity of composition--.

12. In Column 10, line 57, "pepared" should be --prepared--.

Signed and Sealed this ninth Day of December 1975

[SEAL]

Attest:

RUTH C. MASON
*Attesting Officer*

C. MARSHALL DANN
*Commissioner of Patents and Trademarks*